(No Model.)

I. P. DOOLITTLE.
PIPE COUPLING.

No. 558,364. Patented Apr. 14, 1896.

Witnesses
Sidney P. Hollingsworth
J. M. Pond.

Inventor;
Irvin P. Doolittle,
by W. T. Howard
Atty.

UNITED STATES PATENT OFFICE.

IRVIN P. DOOLITTLE, OF REDLANDS, CALIFORNIA.

PIPE-COUPLING.

SPECIFICATION forming part of Letters Patent No. 558,364, dated April 14, 1896.

Application filed December 14, 1894. Serial No. 531,825. (No model.)

*To all whom it may concern:*

Be it known that I, IRVIN P. DOOLITTLE, of Redlands, in the county of San Bernardino and State of California, have invented certain new and useful Improvements in Couplings, of which the following is a specification.

My invention relates to an improved means for expeditiously and firmly uniting sections of pipe, hose, or solid rod, so as to allow them to be readily detached when desired; and it consists in improvements upon my Patent No. 484,656, granted October 18, 1892, being intended to simplify and render more efficient the construction therein described.

Figure 1:
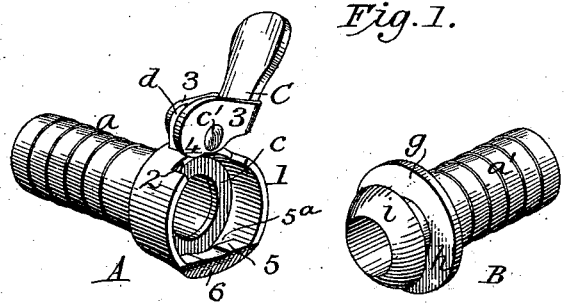
Figure 2:
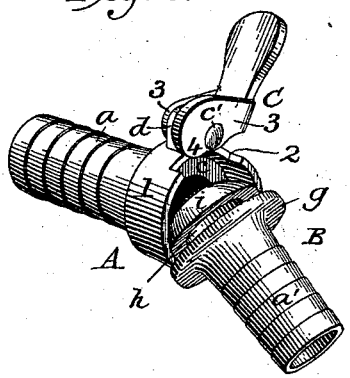
Figure 3:
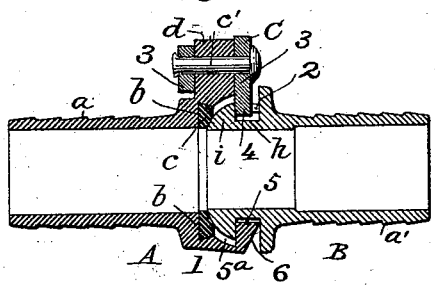
Figure 4:
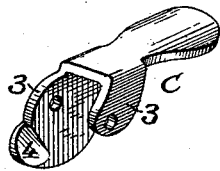
Figure 5:
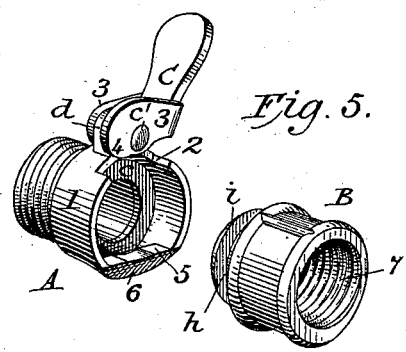

In the accompanying drawings, Figure 1 is a perspective view of the two parts, male and female, of the coupling when separated, the locking-lever of the female part being thrown back. Fig. 2 is a perspective view of the two parts as first brought together for coupling. Fig. 3 is a longitudinal section of the two parts connected. Fig. 4 is a perspective view of the locking-lever. Fig. 5 is a perspective view showing a modification, the two parts of the coupling being separated.

Similar letters and figures of reference indicate similar features in the respective views.

The male and female parts of the coupling are represented by A and B, the first-named being designed to receive the other when the sections of pipe, hose, &c., to which the parts are joined or form a part are to be connected. The part A of the coupling, the general form of which is cylindrical, is provided upon its main portion with ribs $a$ to assist in retaining it within a tubular hose when covered or wrapped by wire or the like. The opposite end 1 of said part A is of enlarged diameter, producing a socket with an internal shoulder $b$, upon which a leather or gum washer $c$ is seated. A sufficient proportionate length is given to the socket portion 1, and on its exterior is formed an ear $d$, to which the locking-lever C is pivoted at $c'$. A segment of the annular edge of the socket portion 1 is removed, as at 2. The locking-lever C is provided with a forked inner end, composed of two sides 3 3, the inner of which is extended beyond the pivot and formed into a cam or wedge 4, which, in the movement of the lever C upon its pivot, enters the opening 2, for a purpose hereinafter described.

The main portion of the male part B of the coupling is also furnished with ribs $a'$, similar to those $a$ of the part A. The part B is also substantially cylindrical in form, it having near its inner end a flange $g$, against which the end of the attached pipe or hose section fits, and having outside of said flange $g$ an annular groove $h$ and a rounded head $i$. It will be observed that the socket portion of the part A of the coupling is, preferably at the point opposite the pivot $c'$ of the lever C, provided with a shoulder 5, and that the edge of the socket, across the length of said projection, is inclined or beveled back, as at 6.

In order to unite the two parts A and B, it being supposed that each is attached to a section of pipe, hose, &c., the two parts are first brought substantially to the position shown in Fig. 2, the inner surface of the rounded head $i$ of the part B being placed over the shoulder 5 of the part A, so as to rest within the depression $5^a$ between said shoulder 5 and the washer $c$.

It will be seen that the inclined or beveled portion 6 allows the bringing together of the parts at such angle as will permit the head $i$ to fit over the shoulder 5. At this time the locking-lever C is thrown back, so that its cam or wedge 4 is elevated above the upper portion of the back edge of the head $i$, and in order to continue the operation of coupling the part B must now be pushed or tilted inward by hand, so that the rounded face of its head $i$ shall fit up in a measure against the washer $c$, so that the back edge of said head shall be brought forward of the point or narrowest part of the cam or wedge 4 of the locking-lever C. This being the position of the two parts of the coupling, the part B will still stand at a slight angle with reference to a line drawn longitudinally through the part A. In order to complete the coupling action, the lever C must now be pushed down by the finger or thumb of the operator, so that the cam or wedge 4 thereof shall press against the back edge of the head $i$ and gradually draw in the rounded exterior of the head against the washer $c$, and at the same time the outer face of the flange $g$ against the trued outer edge of the socket portion 1 of the part A. The two parts of the coupling have now been brought to the position shown in Fig. 3, a perfect union having been effected. The compression of the washer c by the rounded head i insures a perfectly water or air tight joint.

In Fig. 5 the same construction of parts is retained and the same mode of coupling carried out, the only difference between the devices shown in said figure and in Figs. 1 to 3, inclusive, being that the female part of the coupling is threaded exteriorly to adapt it to be screwed into a pipe, hose, &c., and the male part provided with an internal thread 7 to fit it to screw upon the pipe, hose, &c. The part B, when used with a pipe or hose, may, when detached from the part A, be used as a nozzle or tip for watering or sprinkling purposes.

It is obvious that by slight mechanical changes in form, not involving invention, the parts A and B may be adapted for use with metal tubing or solid rods, such as shafting or pump-rods, or the said coupling parts may be formed integrally therewith, if desired, and thus afford reliable means for the expeditious securing of tube or rod sections endwise, such modifications in form and use being manifestly within the scope of my invention.

What I claim is—

1. In a coupling, the female member thereof having a segmental opening in its edge and provided with an ear and a lower shoulder, the edge of said member being inclined or beveled back across the front of said shoulder, combined with a locking-lever pivoted to said ear, and having a cam or wedge adapted to enter said segmental opening, substantially as set forth.

2. In a hose-coupling, the combination of a male section having a head and an annular shoulder, a female section having on its edge a shoulder or lip, the edge of said female section being inclined or beveled back across the front of said shoulder, said female section also having an edge opening opposite said shoulder or lip, and a lever, provided with a cam or wedge, pivoted to the female section in its edge opening and adapted to engage the annular shoulder of the male section, substantially as set forth.

3. In a hose-coupling, the combination of a male section having a head and an annular shoulder, a female section having on its edge a shoulder or lip, the edge of said female section being inclined or beveled back across the front of said shoulder, said female section having also an edge opening opposite said shoulder or lip, a lever, provided with a cam or wedge, pivoted to the female section in its edge opening and adapted to engage the annular shoulder of the male section, and a washer placed between said coupling-sections; the construction being such that, in uniting the two sections, the said inclined or beveled edge shall allow the shoulder of the male section to be hooked over the shoulder or lip of the female section and afterward brought with its face parallel to the face of the female section ready to be drawn into tight engagement therewith by the wedge-like action of the locking-lever, substantially as set forth.

In testimony whereof I hereto set my hand and seal.

IRVIN P. DOOLITTLE. [L. S.]

Witnesses:
J. W. DYRENFORTH,
J. H. LEE.